No. 811,794. PATENTED FEB. 6, 1906.
J. RIDDELL.
BELT.
APPLICATION FILED JULY 9, 1904.
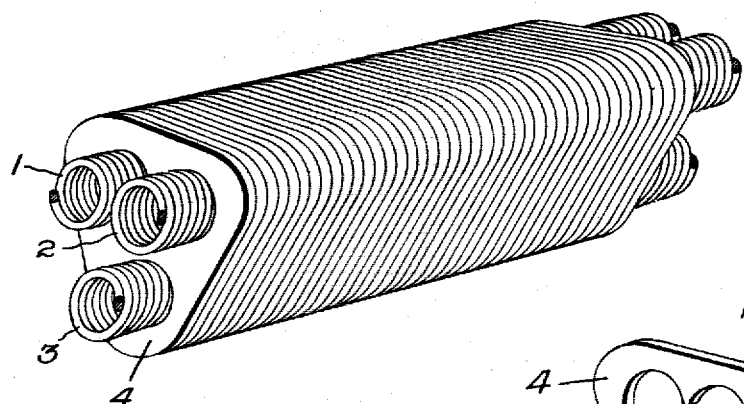
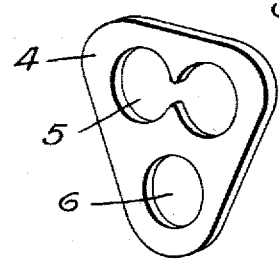
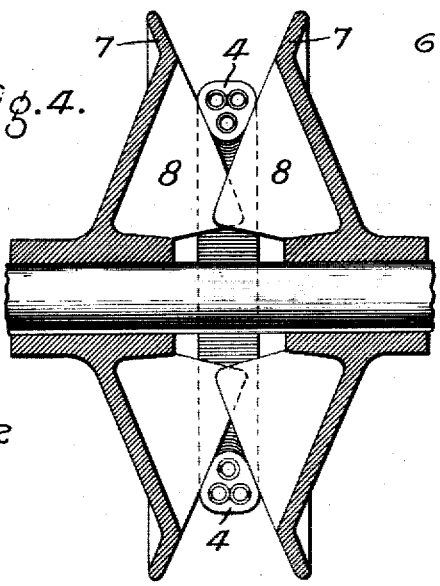
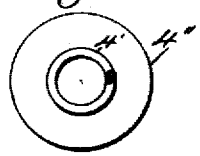
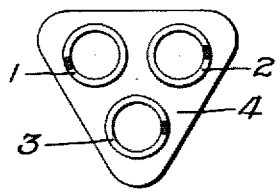
Witnesses:
Marcus L. Byng.
Helen Orford.
Inventor:
John Riddell,
by Albert G. Davis, Atty.

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

BELT.

No. 811,794. Specification of Letters Patent. Patented Feb. 6, 1906.

Application filed July 9, 1904. Serial No. 215,883.

*To all whom it may concern:*

Be it known that I, JOHN RIDDELL, a citizen of the United States, residing at Schenectady, county of Schenectady, State of New York, have invented certain new and useful Improvements in Belts, of which the following is a specification.

This invention relates to belts for transmitting power from one shaft to another in machinery. Its object is to provide a belt that is strong, elastic, and flexible, and it has been designed especially for use with pulleys having V-grooves—such, for example, as expanding pulleys in variable-speed gearing. The belt consists of an elastic core consisting, preferably, of one or more helical springs made of stiff but resilient wire, with the turns close together. I prefer to use a plurality of these springs arranged parallel with each other, and on them are threaded a plurality of loose flat washers in sufficient numbers to stand with their faces in contact. The washers are preferably leather, though fiber or other suitable material may be used. The shape of the washers depends upon the cross-section of the surface on which the belt is to operate, being triangular for a V-shaped groove.

In the accompanying drawings, Figure 1 is a perspective view of a piece of a belt embodying my invention. Fig. 2 is a view of a single washer. Fig. 3 shows a modification. Fig. 4 is a section of an expanding pulley, showing the belt applied thereto. Fig. 5 is a view similar to Fig. 3, showing another modification.

To make a triangular belt, I take three helical springs 1 2 3, made of stiff resilient wire, preferably steel, with the turns in close contact. Two of these, 1 2, are placed side by side and the third, 3, equidistant from both at a little distance. Over these springs are then slipped a lot of flat triangular washers 4, of leather or the like, having holes to accommodate the springs. Thus in Fig. 1 the two upper springs 1 2 are placed close together, so that an 8-shaped hole 5 is made for them in the washer, as shown in Fig. 2, while a separate circular hole 6 is provided for the other spring 3. In Fig. 3 the three springs are equidistant, lying in the angles of an equilateral triangle, so that the washer takes this shape with a separate circular hole for each spring. This shape of belt may be turned to run with any corner in the groove of the pulley, and thus distribute the wear. The washers lie closely together with their faces in contact. Their corners may be rounded off, if desired. After they have been threaded on the springs the ends of the latter are fastened together by brazing or otherwise to complete the belt. If any other section than triangular is adopted, the number and arrangement of the springs, the shape of the washers, and the arrangement of the hole or holes therein will of course be changed to correspond. In Fig. 5 I have shown round washers 4" and a single spring-core 4'.

In variable-speed gearing employing two expanding pulleys belted together trouble has been experienced in getting a belt that will keep tight during the changes in the relative effective diameters of the pulleys, since it is customary to enlarge one of them at the same rate that the other is contracted. This calls for a belt of varying length, for reasons well known to every mechanical engineer familiar with belt-gearing on cone-pulleys. My belt is sufficiently elastic to provide for such changes in length and has been found to work very satisfactorily under such conditions. Fig. 4 shows it applied to an expanding pulley comprising two halves 7, each provided with tapering ribs 8, which interlock and enable the halves to be separated or approached in order to produce a V-groove of varying diameter.

What I claim as new, and desire to secure by Letters Patent of the United States, is—

1. A belt consisting of an elastic core and a covering of loose washers.

2. A belt having an elastic core comprising one or more helical springs, and a covering of loose washers.

3. A belt consisting of a plurality of parallel helical springs, and a plurality of loose washers assembled on the same in close contact.

4. A belt consisting of a plurality of parallel helical wire springs having their turns close together, and a plurality of loose leather washers strung on said springs in close contact.

5. The combination with three parallel helical wire springs two in contact the third equidistant from both, of a plurality of triangular washers each having an 8-shaped hole and a circular hole.

6. In a belt, an elastic core member in the form of a helical spring, and a covering of loose washers.

In witness whereof I have hereunto set my hand this 8th day of July, 1904.

JOHN RIDDELL.

Witnesses:
BENJAMIN B. HULL,
HELEN ORFORD.